United States Patent [19]

Webb et al.

[11] 4,223,539
[45] Sep. 23, 1980

[54] APPARATUS FOR ABSORBING A VAPOR IN A LIQUID AND ABSORPTION REFRIGERATION SYSTEM INCORPORATING SAME

[75] Inventors: Ralph L. Webb, State College, Pa.; Louis J. Mougin, La Crosse, Wis.

[73] Assignee: The Trane Company, La Crosse, Wis.

[21] Appl. No.: 911,729

[22] Filed: Jun. 2, 1978

[51] Int. Cl.³ .................... F25B 15/00; F25B 17/00; F25B 37/00
[52] U.S. Cl. .................................. 62/476; 62/477; 62/494; 165/179; 165/183
[58] Field of Search ............... 62/101, 114, 476, 477, 62/494; 165/179, 183

[56] References Cited

U.S. PATENT DOCUMENTS

| | | | |
|---|---|---|---|
| 2,318,621 | 5/1943 | O'Brien | 62/494 |
| 2,338,223 | 1/1944 | Anderson, Jr. | 62/494 |
| 2,598,037 | 5/1952 | Dail | 62/494 |
| 2,873,140 | 2/1959 | Merrick | 62/477 |
| 3,276,217 | 10/1966 | Bourne et al. | 62/101 |
| 3,593,540 | 7/1971 | Hopkins | 62/476 |
| 4,059,147 | 11/1977 | Thorne | 165/179 |
| 4,090,372 | 5/1978 | Lamb | 62/476 |

FOREIGN PATENT DOCUMENTS 565027 10/1944 United Kingdom ............... 165/179
878916 10/1961 United Kingdom ............... 165/183

OTHER PUBLICATIONS

"Effect of Interfacial Turbulence on the Rate of Absorption", by Eli Ruckenstein, *AICHE Journal*, Nov. 1970, vol. 16, No. 6, pp. 1090-1100.
"Mass Transfer in the Case of Interfacial Turbulence Induced by the Marangoni Effect", by E. Ruckenstein, Int. J. Heat Mass Transfer, vol. 11, pp. 1753-1760, Pergamon Press, 1968.
"Roll Cell Generation by Surface Movements in Hydrodynamically Stable Systems", *Chem. Eng. Science*, 1968, vol. 23, pp. 1511-1512, Pergamon Press.
"Interfacial Turbulence: Hydrodynamic Instability and the Marangoni Effect", *AICHE Journal*, Dec. 1959, vol. 5, No. 4, pp. 514-523.
"A New Type of Roughened Heat Transfer Surface Selected by Flow Visualization Techniques", by P. L. Mantle, Berkeley Nuclear Lab., Cent. Elec. Gen. Brd, Eng..
"The Effect of Large-Scale Roughness in Promoting Gas Absorption", by J. T. Davies and K. V. Warner, *Chem. Eng. Science*, vol. 24, pp. 231-240, published by Pergamon Press.
*Mass Transfer* by Sherwood, Pigford & Wilke, McGraw-Hill, 1975, pp. 184-188.
"Chemical Engineering Science", 1964, vol. 19, pp. 505-506, Pergamon Press, Ltd., Oxford.

*Primary Examiner*—Lloyd L. King
*Attorney, Agent, or Firm*—Carl M. Lewis; Peter D. Ferguson

[57] ABSTRACT

Apparatus and method are disclosed for absorbing a subject vapor in an absorbent liquid wherein an additive is provided which exists in at least a vapor phase concurrently with the subject vapor, which additive is effective to reduce the surface tension of the absorbent liquid upon contact therewith. A heat transfer member is provided having a first surface over which absorbent liquid is passed such that a film is formed thereon, and a second surface over which a heat transfer fluid is passed in order to remove heat from the absorption process. Means are provided associated with the first surface of the heat transfer member for promoting interfacial turbulence between the film of absorbent liquid and the subject vapor such that a series of preferential absorption sites is established along the first surface. In a preferred embodiment, the last-named means comprise a plurality of protuberances extending outwardly from the first surface and spaced from one another so as to define a two dimensional arrangement of protuberances along the first surface. As one example of the application of the invention, a lithium bromide absorption refrigeration system is disclosed wherein the absorber thereof is designed in accordance with the present invention.

21 Claims, 6 Drawing Figures

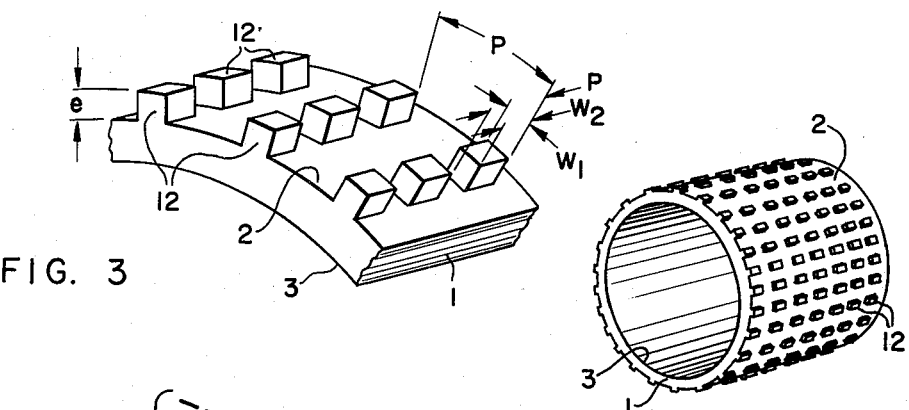
FIG. 3
FIG. 4
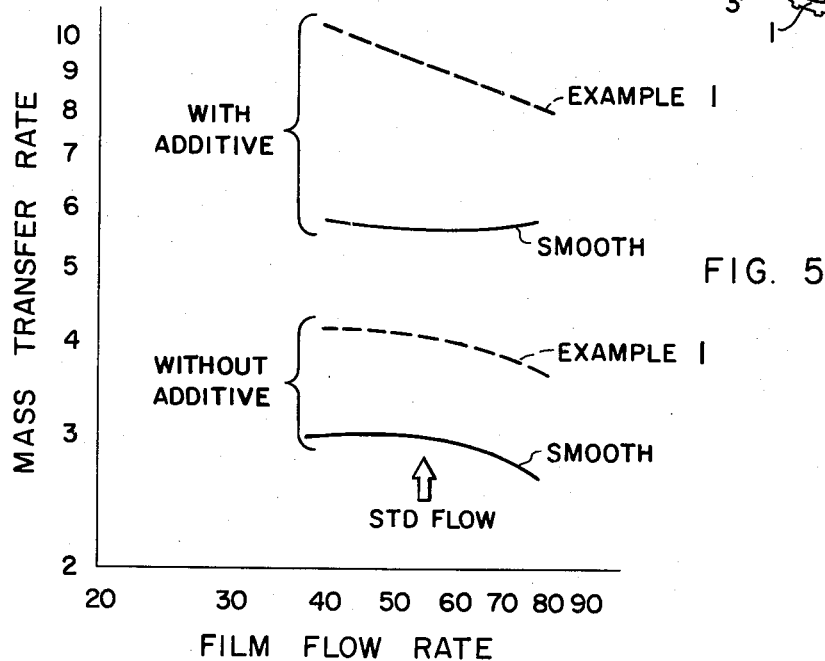
FIG. 5
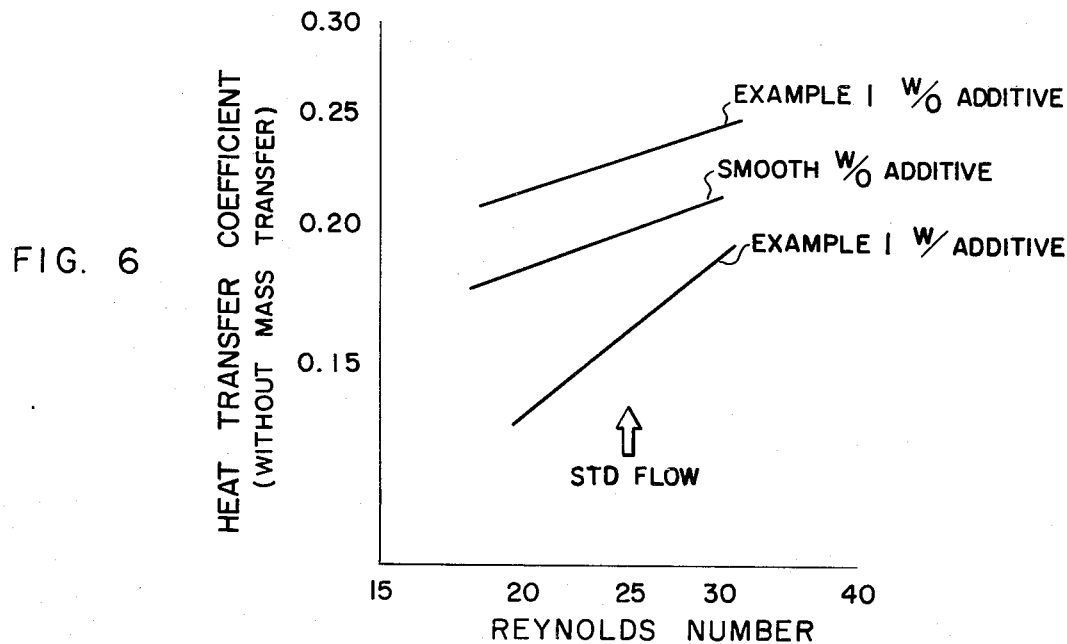
FIG. 6

APPARATUS FOR ABSORBING A VAPOR IN A LIQUID AND ABSORPTION REFRIGERATION SYSTEM INCORPORATING SAME

BACKGROUND OF THE INVENTION

1. Field of the Invention

The present invention relates generally to those apparatus and methods wherein a subject vapor is absorbed within an absorbent liquid by direct contact therebetween, accompanied by removal of the heat of absorption from such apparatus or method. The field to which applicants' invention has application is further restricted to those apparatus and methods described wherein an additive is included which exists in at least a vapor phase concurrently with the subject vapor, which additive is effective to reduce the surface tension of the absorbent liquid upon contact therewith. In a specific application, the invention relates to an absorption refrigeration system of the type utilizing an aqueous solution of lithium bromide as the absorbent solution and water as the refrigerant, wherein an octyl alcohol additive is provided in order to increase the performance of the system.

2. Description of the Prior Art

In the technical literature dealing with the theoretical aspects of mass transfer, numerous articles appear which discuss the importance of interfacial turbulence between phases which serves to enhance or promote the mass transfer mechanism. Interfacial turbulence may exist both with respect to liquid/liquid interfaces and liquid/vapor interfaces, the latter being relevant to the present discussion.

A textbook entitled, *Mass Transfer* by Sherwood, Pigford, and Wilke (McGraw-Hill, 1975) contains a discussion of interfacial turbulence from pages 184 through 188. In this discussion, the authors observe that abnormally high mass transfer rates occur in those apparatus and methods wherein marked interfacial turbulence is present. They go on to attribute this phenomenon to the "Marangoni effect", a term applied to instability which develops within a film of liquid due to random variations in surface tension at the film interface. This instability generates ripples and "roll cells" to cause liquid circulation within the film between its surface and bulk. The authors attribute the presence of the instability within the liquid film to the fact that, as mass transfer occurs, local concentrations develop which result in variations in surface tension of the liquid.

It has been known for many years to those skilled in the art of absorption refrigeration that the performance and capacity of an absorption refrigeration system of the type utilizing an aqueous solution of lithium bromide as the absorbent and water as the refrigerant, may be increased by the addition of certain additives such as octyl alcohol (2 ethyl-n-hexanol). A brief discussion of this concept appears in U.S. Pat. No. 3,276,217. This increase in performance has been attributed to a number of factors, including the creation of a turbulent film on the exterior surfaces of the absorber tubes, resulting in better heat transfer between the film and the tubes. It is further suggested that the addition of octyl alcohol effects dropwise condensation of refrigerant vapor in the condenser, resulting in improved heat transfer in that part of the system. U.S. Pat. No. 3,593,540 also discusses the improved results obtained through the addition of octyl alcohol to a lithium bromide absorption refrigeration system, attributing such improved results to increased heat transfer in both the absorber and condenser.

SUMMARY OF THE INVENTION, OBJECTS

The present invention relates to apparatus and method for absorbing a subject vapor in an absorbent liquid, and, in a specific embodiment, relates to an absorption refrigeration system wherein the absorber section of the system is constructed in accordance with the invention.

The improved apparatus of applicants' invention includes a system wherein an absorbent liquid and subject vapor are brought into direct contact with each other such that the subject vapor is absorbed by the absorbent liquid. An additive is present within the system which exists in at least a vapor phase concurrently with the subject vapor, which additive is effective to reduce the surface tension of the absorbent liquid upon contact therewith. A heat transfer member is provided having a first surface over which absorbent liquid is passed in heat transfer relationship such that a film of absorbent liquid is formed thereon, and a second surface over which a heat transfer fluid is passed in order to remove heat from the apparatus. Means are provided for bringing the vapor mixture into direct contact with the film of absorbent liquid which is in heat transfer relationship with the first surface. In order to promote interfacial turbulence between the film of absorbent liquid and the vapor mixture, means are associated with the first surface of the heat transfer member to establish along said first surface a series of preferential absorption sites whereat the absorption of subject vapor in absorbent liquid is enhanced, thereby increasing the concentration of additive in its vapor phase immediately adjacent said sites so as to reduce the surface tension of the absorbent liquid at said sites and thereby generate roll cell motion within the film of absorbent liquid such that relatively cool absorbent solution immediately adjacent the first surface of the heat transfer member is caused to circulate therefrom to the interface between the film of absorbent liquid and vapor mixture to thereby increase the absorption capacity of the apparatus.

The aforementioned preferential absorption sites are spaced from one another such that active roll cell motion within the film of absorbent liquid occurs over substantially all of said first surface so as to maximize the absorption capacity of the apparatus.

In a preferred embodiment, the means associated with the first surface of the heat transfer member comprise a plurality of thermally conductive protuberances extending outwardly from the first surface and spaced from one another so as to define a two dimensional arrangement of protuberances along said first surface, said protuberances being of a size and shape such that the film of absorbent liquid flows therebetween over said first surface and undergoes roll cell motion. Preferably, the protuberances have a height substantially equal to the thickness of the film of absorbent liquid on the first surface and are spaced from one another by a dimension equal to from about 3 to 7 times their height and, in an optimum range, from about 3 to 5 times their height.

A further aspect of the present invention comprises a method of absorbing a subject vapor in an absorbent liquid wherein interfacial turbulence beween a film of absorbent liquid and a vapor mixture is promoted by estbablishing along a first surface of a heat transfer member a series of preferential absorption sites whereat the absorption of subject vapor in the absorbent liquid is enhanced, as described above.

In a specific embodiment, the invention comprises an absorption refrigeration system of the type utilizing a liquid absorbent solution and a refrigerant, further including an additive for increasing the performance thereof. The system is conventional to the extent that it includes generator means, condenser means, evaporator means, absorber means, and pump means connected in an operative absorption refrigeration system. The absorber means, which receives concentrated absorbent solution from the generator means and refrigerant vapor from the evaporator means, is constructed in accordance with the present invention and includes a plurality of heat transfer members each having a first surface and a second surface. Means are provided for passing concentrated absorbent solution in heat transfer relationship with said first surfaces such that a film of absorbent solution is formed thereon, and for passing a heat transfer fluid in heat transfer relationship with said second surfaces whereby heat may be transferred from the absorbent solution, through the heat transfer members, to the heat transfer fluid. Means are further provided for bringing the vapor mixture (refrigerant vapor plus additive vapor) into direct contact with the absorbent solution which is in heat transfer relationship with the first surfaces.

Means are associated with the first surfaces of said heat transfer members for promoting interfacial turbulence between the film of absorbent solution which is in heat transfer relationship with the first surfaces and said vapor mixture by establishing along said first surfaces a series of preferential absorption sites whereat the absorption of refrigerant vapor in absorbent solution is enhanced, thereby increasing the concentration of additive in its vapor phase immediately adjacent said sites so as to reduce the surface tension of the absorbent solution at said site and thereby generate roll cell motion within the film of absorbent solution such that relatively cool absorbent solution immediately adjacent the first surfaces of the heat transfer members is caused to circulate therefrom to the interface between the film of absorbent solution and vapor mixture to thereby increase the absorption capacity of said absorber means.

In a preferred embodiment, the means associated with the first surfaces of the heat transfer members comprise a plurality of thermally conductive protuberances extending outwardly from the respective first surfaces and spaced from one another so as to define a two dimensional arrangement of protuberances along the respective first surfaces. The protuberances preferably have a height substantially equal to the thickness of the film of absorbent solution formed on the respective first surfaces and are spaced from one another by a dimension equal to from about 3 to 7 times their height, and in an optimum range, from about 3 to 5 times their height.

The preferred working fluids for the absorption refrigeration system comprise an aqueous solution of lithium bromide as the absorbent, water as the refrigerant, and octyl alcohol as the additive.

Accordingly, it is an object of the present invention to provide apparatus and method for absorbing a subject vapor in an absorbent liquid in the presence of an additive which exists in at least a vapor phase concurrently with the subject vapor in such a manner that the absorption capacity of the apparatus and method is increased over the already-enhanced capacity provided by the addition of said additive.

It is a further object of the present invention to provide apparatus and method as described above wherein a heat transfer member is provided having a first surface over which a film of absorbent liquid is passed and wherein means are associated with said first surface for promoting interfacial turbulence between the film of absorbent liquid and the vapor mixture which is brought into direct contact therewith.

A related object of the present invention is to promote interfacial turbulence as described above by establishing along said first surface a series of preferential absorption sites whereat the absorption of subject vapor in absorbent liquid is enhanced, thereby increasing the concentration of additive in its vapor phase immediately adjacent said sites so as to reduce the surface tension of the absorbent liquid at said sites and thereby generate roll cell motion within the film of absorbent liquid such that relatively cool absorbent solution immediately adjacent the first surface of the heat transfer member is caused to circulate therefrom to the interface between the film of absorbent liquid and vapor mixture to thereby increase the absorption capacity of the apparatus and method.

A further object of the present invention lies specifically in the provision of a plurality of thermally conductive protuberances extending outwardly from the first surface of the heat transfer member, which protuberances constitute the means associated with the first surface for promoting interfacial turbulence.

Yet another object of the invention is the provision of an absorption refrigeration system of the type utilizing a liquid absorbent solution and a refrigerant, further including an additive for increasing the performance thereof, and wherein the absorber section of said system is constructed in accordance with the present invention in order to increase the capacity thereof over that provided merely by the addition of the additive to the system.

These and other objects of the present invention will become apparent from the following description of a preferred embodiment and by reference to the accompanying drawings.

BRIEF DESCRIPTION OF THE DRAWINGS

FIG. 3 is an enlarged perspective view illustrating the dimensional relationships necessary to an understanding of applicants' invention.

FIG. 4 is a perspective view of a preferred embodiment of the heat transfer member to be used in applicants' invention.

FIG. 5 is a graph plotting mass transfer rate versus film flow rate which shows the improved performance of applicants' invention when compared with the prior art.

FIG. 6 is a graph plotting heat transfer coefficient versus Reynolds number for the heat transfer member constructed in accordance with applicants' invention, determined under conditions without mass transfer taking place.

DESCRIPTION OF A PREFERRED EMBODIMENT

Figure 1:
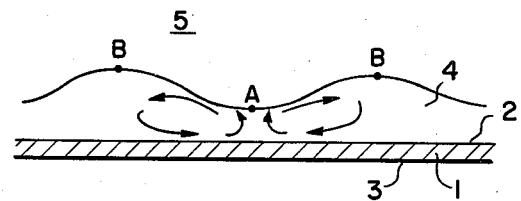
FIG. 1 is a cross-sectional view illustrating the mechanism by which applicants' believe the subject absorption apparatus and method operate.

Turning now to FIG. 1 of the drawings, a heat transfer member 1 is illustrated in cross section and includes a smooth first surface 2 and a second surface 3. Passing over first surface 2 is a film of absorbent liquid 4 which is in direct contact with a vapor mixture indicated generally by reference numeral 5 and which includes a subject vapor to be absorbed by absorbent liquid 4 and also includes an additive which exists at least in a vapor phase concurrently with the subject vapor. The additive is effective to reduce the surface tension of absorbent liquid 4 upon contact therewith.

In order to remove heat of absorption from absorbent liquid 4, a heat transfer fluid is passed in heat transfer relationship with second surface 3, as will become apparent hereinafter.

It is applicants' belief that, during the absorption process, certain, randomly spaced points on first surface 2 will, for one reason or another, become cooler than adjacent points such that a preferential absorption site is established due to the higher affinity for absorption exhibited by the cooled absorbent liquid at that point. Such a point is illustrated at A, whereas adjacent points B remain at a "normal" temperature not constituting a preferential absorption site.

Since the relatively cooler absorbent liquid at point A exhibits a high affinity for absorbing subject vapor from vapor mixture 5, it follows that the vapor mixture immediately adjacent point A will thereafter have an abnormally high concentration of additive, the subject vapor having been absorbed therefrom into absorbent liquid 4. Since the additive is effective to reduce the surface tension of the absorbent liquid, the surface tension of absorbent liquid 4 at point A will be low when compared with that at points B and will result in the interfacial turbulence or "roll cell" motion as illustrated. Such interfacial turbulence is highly desirable in apparatus and methods of the type under consideration since, as illustrated by the arrows in FIG. 1, this results in relatively cool absorbent liquid adjacent first surface 2 being circulated in an upward direction (due to the roll cell) for direct contact with vapor mixture 5, thereby increasing the absorption capacity of the apparatus and method.

It is applicants' belief that the above-described mechanism explains the increase in performance which is noted when an octyl alcohol additive is added to an absorption refrigeration system of the type utilizing an aqueous solution of lithium bromide as the absorbent and water as the refrigerant. Visual observations of the absorber section of such a system disclose that a more turbulent film of absorbent solution is produced on the heat transfer tubes of the absorber section which would tend to confirm this belief.

Operating under this belief, applicants concluded that, in order to further increase the performance of the absorber over that provided by the addition of the octyl alcohol additive, it would be necessary to establish additional preferential absorption sites of the type indicated at A in FIG. 1 such that interfacial turbulence would be promoted to the maximum extent over all of first surface 2. Before proceeding to applicants' novel solution to this problem, however, it may be desirable to review the basic operating principles of the conventional absorption refrigeration system illustrated in FIG. 2 which incorporates applicants' invention.

Figure 2:
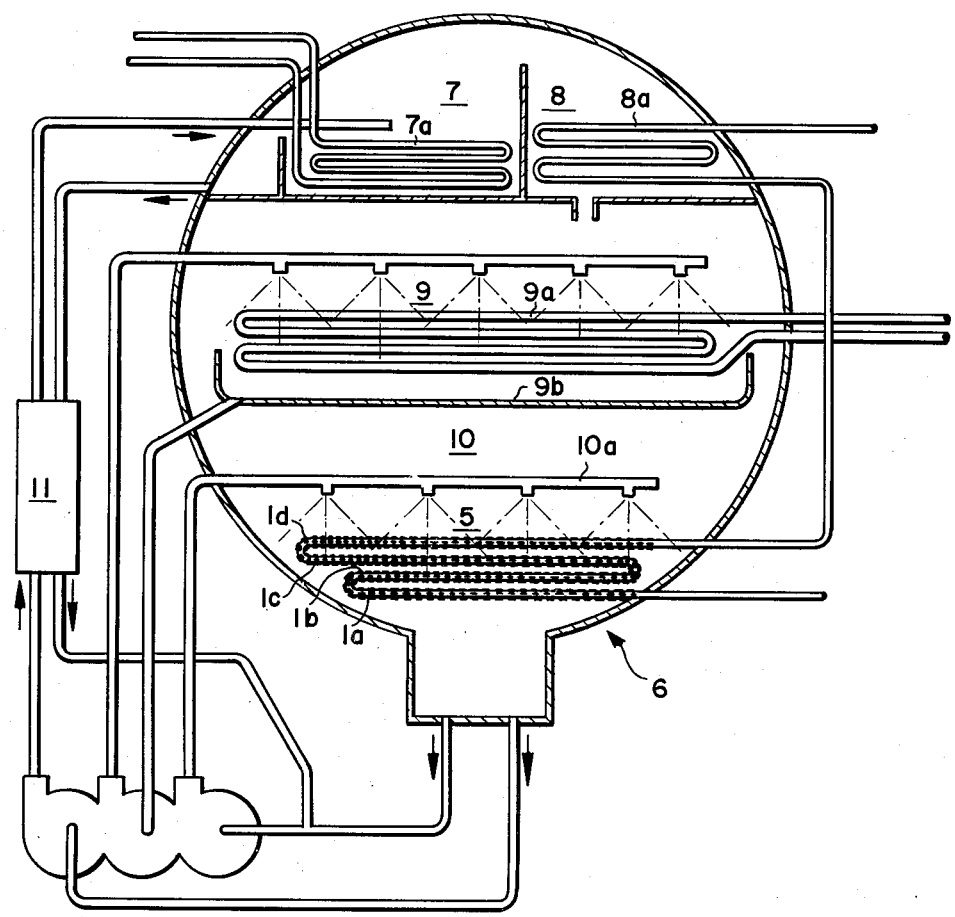
FIG. 2 is a diagrammatic illustration of a conventional absorption refrigeration system incorporating applicants' invention.

The absorption refrigeration system indicated generally at 6 in FIG. 2 is of conventional construction and includes generator means 7 wherein a heat transfer fluid such as hot water or steam passes through heat exchange coil 7a in order to vaporize refrigerant from absorbent solution, to thereby concentrate the absorbent solution. The resulting refrigerant vapor passes to condenser means 8 wherein it is condensed by heat exchange with a heat transfer fluid passing through coil 8a. The thus-condensed refrigerant then passes via an orifice into evaporator means 9 wherein it is vaporized in heat exchange relationship with a refrigeration load such as water to be chilled passing through heat exchange coil 9a.

As the refrigerant vaporizes in evaporator means 9, it passes around pan 9b into absorber means 10 for absorption in concentrated absorbent solution. Absorber means 10 includes a plurality of heat transfer members 1a through 1d which, in a preferred embodiment, comprise a pluraltiy of horizontally disposed tubes having a heat transfer fluid passing therethrough to remove the heat of absorption from absorber means 10.

A spray header 10a is provided within absorber means 10 for passing concentrated absorbent solution in heat transfer relationship with heat transfer members 1a through 1d such that a film of absorbent solution is formed on the outer, first surfaces thereof. The resulting dilute absorbent solution is returned to generator means 7 via suitable conduits and pump means as illustrated. Similarly, spray header 10a is supplied with absorbent solution from the sump of absorber means 10 via the conduit and pump means illustrated. As is conventional, concentrated absorbent solution passing from generator means 7 to absorber means 10 is placed in heat exchange relationship with dilute absorbent solution passing from absorber means 10 to generator means 7 by way of solution heat exchanger 11.

Turning now to FIGS. 3 and 4 of the drawings, a heat transfer member is illustrated which, when utilized in the apparatus and method of the present invention, results in increased absorption capacity. The heat transfer member is indicated as having a wall portion 1 similar to that illustrated in FIG. 1, and also includes a first surface 2 and a second surface 3. In the preferred embodiment, the heat transfer member comprises a tubular element through which a heat transfer fluid passes in heat transfer relationship with second surface 3 and having an outer first surface 2 over which absorbent liquid is passed such that a film of absorbent liquid is formed thereon.

It will be recalled that, consistent with applicants' belief as to the mechanism by which mass transfer proceeds in apparatus and method of the type under consideration, that the absorption capacity may be increased by promoting interfacial turbulence between the film of absorbent liquid in heat transfer relationship with first surface 2 and the vapor mixture. This is accomplished as aforesaid by establishing along first surface 2 a series of preferential absorption sites whereat the absorption of subject vapor in the absorbent liquid is enhanced.

In the preferred embodiment illustrated in FIGS. 3 and 4, this is accomplished by the provision of a plurality of protuberances 12 extending outwardly from first surface 2 and spaced from one another so as to define a two dimensional arrangement of protuberances along first surface 2. Protuberances 12 are of a size and shape such that the film of absorbent liquid flows therebetween over said first surface and may undergo roll cell motion. It has been found desirable that protuberances 12 have a height substantially equal to the thickness of the film of absorbent liquid passing over first surface 2.

Protuberances 12 serve the function of providing preferential absorption sites by producing localized areas of absorbent solution which is cooled below the temperature of surrounding absorbent liquid. Thus, each protuberance 12 corresponds to a point A as illustrated in FIG. 1 and serves to produce roll cell motion by the same mechanism described with respect to FIG. 1. It will be appreciated that, due to the increased roll cell motion produced by these intentionally created preferential absorption sites, that interfacial turbulence between the absorbent liquid and subject vapor will be increased, resulting in an overall increase in the absorption capacity of the apparatus and method over that already provided by addition of the additive thereto.

Applicants have conducted tests of heat transfer members designed in accordance with FIGS. 3 and 4 when incorporated in a test absorption refrigeration apparatus utilizing an aqueous solution of lithium bromide as the absorbent, water as the refrigerant, and octyl alcohol (2 ethyl-1-hexanol) as the additive. For test purposes, three examples were constructed having protuberances of varying size, shape, and spacing extending outwardly from first surface 2. The dimensions of these three examples are summarized in the table which appears immediately below:

TABLE I

| | | | (Dimensions in Inches) | | | | |
|---|---|---|---|---|---|---|---|
| e | $W_1$ | $W_2$ | P | P/e | Aex/As | Mx/Ms | $M^1s/M^1s$ |
| Ex 1 .015 | .015 | .015 | .050 | 3.3 | 1.32 | 1.60 | 1.45 |
| Ex 2 .015 | .016 | .030 | .100 | 6.7 | 1.08 | 1.33 | 1.24 |
| Ex 3 .016 | .015 | .015 | .038 | 2.4 | 1.62 | 1.43 | 1.35 |

The data summarized in Table I inclues not only the basic dimensions of the example heat transfer members, but also includes the ratio Aex/As which represents the ratio of total surface area of the example surface to that of a smooth tube having a diameter equal to the example heat transfer member measured from the outermost extremeties of protuberances 12. Thus, for example, Example 1 had 32% more surface area due to the presence of protuberances 12 than did a smooth tube of comparable diameter.

The columns labeled Mx/Ms and $M^1x/M^1s$ appearing in Table I are the ratios of mass transfer rate of the absorber of the test absorption refrigeration system which were attained during tests of Examples 1, 2, and 3. The last column of Table I is probably the more significant measure of increased mass transfer since the values therein have been corrected for an increase in the inlet concentration of the absorbent solution which was required due to the maintaining constant of other system operating variables, including outlet concentration, during the tests. Thus, it can be said that Example 1 produced a 45% increase in mass transfer within the absorber over that provided by a smooth tube operating under similar conditions.

The graph illustrated in FIG. 5 further points out the increase in absorption capacity provided by the present invention. This graph illustrates the results achieved by Example 1 of the tested heat transfer members and includes data with respect to tests conducted both with the octyl alcohol additive and without. As is apparent, the addition of the additive produced marked increase in mass transfer rate for both a heat transfer member comprising a smooth tube and one comprising a tube constructed in accordance with Example 1 as expected. Thus, for applicants' invention to be judged successful, it was necessary that the heat transfer member of Example 1 result in improved performance in an apparatus and method which has already been improved by the addition of the additive. It is readily apparent from FIG. 5 that applicants' invention has succeeded in this respect.

In order to check applicants' belief as to the mechanism by which interfacial turbulence is promoted by their invention, tests were run on a heat transfer member constructed in accordance with Example 1 under conditions of pure heat transfer, i.e., without any mass transfer taking place. This was done utilizing the same test absorption refrigeration apparatus as before, but with an inert gas present within the absorber section while absorbent solution was being passed over the tubular heat transfer members. The results of this test are graphically illustrated in FIG. 6 wherein heat transfer coefficient is plotted against Reynolds number of the absorbent solution flowing over the tubular heat transfer members. The flow rates were maintained over substantially the same range as in the mass transfer tests as indicated by the legend "STD FLOW" which appears in the graphs of both FIGS. 5 and 6.

As one might expect, the heat transfer coefficient of the tube of Example 1 proved to be slightly higher (by about 15%) than that of a smooth tube when tested for pure heat transfer without additive present in the absorbent solution. A rather surprising result was found when Example 1 was tested for pure heat transfer with the octyl alcohol present in that its heat transfer coefficient was actually lower than that of Example 1 when tested without the additive present. While applicants have no explanation for this anomaly, the important information to be learned from FIG. 6 is that, while protuberances 12 may increase the heat transfer coefficient of the heat transfer member, which it might be argued would lead to an increase in its mass transfer capabilities, the test results of Table I and FIG. 5 illustrate increases in mass transfer far beyond that which can be attributed merely to an increase in heat transfer capability of the heat transfer members.

It is thus applicants' firm belief that, in accordance with their belief as to the mechanism by which mass transfer occurs in apparatus and methods of the type under consideration, they have successfully designed a heat transfer member having means associated with the first surface thereof for promoting interfacial turbulence which results in a marked increase in absorption capacity thereof.

The data shown in Table I confirm that the performance of the individual examples is dependent to a significant degree upon the spacing of protuberances 12 from one another. The ratio P/e has been included in Table I in order to bring this out, and establishes that a range of P/e from about 3 to about 7 produces large increases in mass transfer with relatively small increases in surface area of the heat transfer member. In terms of material costs, applicants belief that an optimum range of the ratio P/e may lie from about 3 to 5.

In the specific case of an absorption refrigeration system utilizing an aqueous solution of lithium bromide as the absorbent and water as the refrigerant, applicants believe that protuberances 12 should have a height of from about 0.010 inches to about 0.020 inches and should be spaced from one another by a dimension equal to from about 3 to 7 times their height, preferably 3 to 5 times their height.

Although the three examples tested by applicants embodied rectangular or cube-shaped protuberances 12, it is believed that other common shapes such as cones, pyramids, truncated variations thereof, or other types of protuberances could be used with equal success to those tested.

The more critical consideration is believed to be the spacing along first surface 2 of the preferential absorption sites which are established by the means associated therewith. It is important that active roll cell motion occur over substantially all of the first surface so as to maximize the absorption capacity of the apparatus and method.

Although the invention has been described with respect to a preferred embodiment, it is to be understood that modifications thereto will be apparent to those skilled in the art within the scope and spirit of the invention as defined in the claims which follow.

We claim:

1. An absorption refrigeration system of the type utilizng a liquid absorbent solution and a refrigerant, and further including an additive for increasing the performance thereof, said system comprising
   a. generator means for vaporizing refrigerant from said absorbent solution and thereby concentrating same;
   b. condenser means connected to said generator means for receiving high pressure refrigerant vapor therefrom and condensing same;
   c. evaporator means connected to said condenser means for receiving condensed refrigerant and vaporizing same in heat exchange with a refrigeration load;
   d. absorber means connected to said generator means for receiving concentrated absorbent solution and to said evaportor means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absobent solution upon contact therewith, said absorber means including
      i. a plurality of heat transfer members each having a first surface and a second surface;
      ii. means for passing a heat transfer fluid in heat transfer relationship with said second surfaces;
      iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;
      iv. means for bringing said vapor mixture into direct contact with absorbent solution which is in heat transfer relationship with said first surfaces; and
      v. a plurality of protuberances extending outwardly from said respective first surfaces and spaced from one another so as to define a two dimensional arrangement of protuberances along said respective first surfaces, said protuberances being of a size and shape such that the film of absorbent solution flows therebetween over said first surface, said protuberances having a height substantially equal to the thickness of the film of absorbent solution formed on said respective first surfaces and being spaced from one another along said respective first surfaces by a dimension equal to from about 3 to 7 times their height; and
   e. pump means connected to said absorber means and said generator means for returning dilute absorption solution from said absorber means to said generator means.

2. Apparatus for absorbing a subject vapor in an absorbent liquid comprising
   a. a system wherein absorbent liquid and subject vapor are brought into direct contact with each other whereby the subject vapor is absorbed by the absorbent liquid, said system further containing an additive which exists in at least a vapor phase concurrently with the subject vapor, thereby forming a vapor mixture, said additive being effective to reduce the surface tension of the absorbent liquid upon contact therewith;
   b. a heat transfer member having a first surface exposed to the interior of said closed system and a second surface;
   c. means for passing a heat transfer fluid in heat transfer relationship with said second surface;
   d. means for passing said absorbent liquid in heat transfer relationship with said first surface such that a film of absorbent liquid is formed thereon, whereby heat may be transferred from said absorbent liquid, through said heat transfer member, to said heat transfer fluid;
   e. means for bringing said vapor mixture into direct contact with the film of absorbent liquid which is in heat transfer relationship with said first surface; and
   f. means associated with the first surface of said heat transfer member for promoting interfacial turbulence between the film of absorbent liquid which is in heat transfer relationship with said first surface and said vapor mixture by establishing along said first surface a series of preferential absorption sites whereat the absorption of refrigerant vapor in said absorbent liquid is enhanced, thereby increasing the concentration of additive in its vapor phase immediately adjacent said sites so as to reduce the surface tension of the absorbent liquid at said sites and thereby generate roll cell motion within the film of absorbent liquid such that relatively cool absorbent solution immediately adjacent the first surface of said heat transfer member is caused to circulate therefrom to the interface between said film of absorbent liquid and vapor mixture to thereby increase the absorption capacity of said apparatus, said means associated with the first surface of said heat transfer member comprising a plurality of protuberances extending outwardly from said first surface, having a height substantially equal to the thickness of the film of absorbent liquid formed on said first surface, and spaced from one another so as to define a two dimensional arrangement of protuberances along said first surface, said protuberances being of a size and shape such that the film of absorbent liquid flows therebetween over said first surface and undergoes said roll cell motion.

3. The apparatus of claim 2 wherein said preferential absorption sites are spaced from one another such that active roll cell motion within said film of absorbent liquid occurs over substantially all of said first surface so as to maximize the absorption capacity of said apparatus.

4. The apparatus of claim 2 wherein said protuberances are spaced from one another along said first surface by a dimension equal to from about 3 to 7 times their height.

5. The apparatus of claim 4 wherein said protuberances are spaced from one another along said first surface by a dimension equal to from about 3 to 5 times their height.

6. The apparatus of claim 2 wherein said protuberances associated with the first surface of said heat transfer member increase the surface area of said first surface over that provided by a smooth surface, characterized in that said protuberances increase the absorption capacity of said apparatus over that provided by a smooth surface by an amount substantially greater than said increase in surface area.

7. An absorption refrigeration system of the type utilizing a liquid absorbent solution and a refrigerant, and further including an additive for increasing the performance thereof, said system comprising
   a. generator means for vaporizing refrigerant from said absorbent solution and thereby concentrating same;
   b. condenser means connected to said generator means for receiving high pressure refrigerant vapor therefrom and condensing same;
   c. evaporator means connected to said condenser means for receiving condensed refrigerant and vaporizing same in heat exchange with a refrigeration load;
   d. absorber means connected to said generator means for receiving concentrated absorbent solution and to said evaporator means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absorbent solution upon contact therewith, said absorber means including
      i. a plurality of heat transfer members each having a first surface and a second surface;
      ii. means for passing a heat transfer fluid in heat transfer relationship with said second surfaces;
      iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;
      iv. means for bringing said vapor mixture into direct contact with the film of absorbent solution which is in heat transfer relationship with said first surfaces; and
      v. means associated with the first surfaces of said heat transfer members for promoting interfacial turbulence between the film of absorbent solution which is in heat transfer relationship with said first surfaces and said vapor mixture by establishing along said first surfaces a series of preferential absorption sites whereat the absorption of refrigerant vapor in said absorbent solution is enhanced, thereby increasing the concentration of additive in its vapor phase immediately adjacent said sites so as to reduce the surface tension of the absorbent solution at said sites and thereby generate roll cell motion within the film of absorbent solution such that relatively cool absorbent solution immediately adjacent the first surfaces of said heat transfer members is caused to circulate therefrom to the interface between said film of absorbent solution and vapor mixture to thereby increase the absorption capacity of said absorber means, said means associated with the first surfaces of said heat transfer members comprising a plurality of protuberances extending outwardly from said respective first surfaces, having a height substantially equal to the thickness of the film of absorbent solution formed on said respective first surfaces, and spaced from one another so as to define a two dimensional arrangement of protuberances along said respective first surfaces, said protuberances being of a size and shape such that the film of absorbent solution flows therebetween over said first surface and undergoes said roll cell motion; and
   e. pump means connected to said absorber means and said generator means for returning dilute absorption solution from said absorber means to said generator means.

8. The absorption refrigeration system of claim 7 wherein said protuberances are spaced from one another along said respective first surfaces by a dimension equal to from about 3 to 7 times their height.

9. The absorption refrigeration system of claim 8 wherein said preferential absorption sites are spaced from one another such that active roll cell motion within said film of absorbent liquid occurs over substantially all of said first surfaces so as to maximize the absorption capacity of said apparatus.

10. The absorption refrigeration system of claim 8 wherein said protuberances are spaced from one another along said respective first surfaces by a dimension equal to from about 3 to times their height.

11. The absorption refrigeration system of claim 7 wherein said means protuberances associated with the first surfaces of said heat transfer members increase the surface area of said first surfaces over that provided by a smooth surface, characterized in that said protuberances increase the absorption capacity of said absorber means over that provided by a smooth surface by an amount substantially greater than said increase in surface area.

12. An absorption refrigeration system of the type utilizing a liquid absorbent comprising an aqueous solution of lithium bromide and a refrigerant comprising water, and further including an additive for increasing the performance thereof, said system comprising
   a. generator means for vaporizing refrigerant from said absorbent solution and thereby concentrating same;
   b. condenser means connected to said generator means for receiving high pressure refrigerant vapor therefrom and condensing same;
   c. evaporator means connected to said condenser means for receiving condensed refrigerant and vaporizing same in heat exchange with a refrigeration load;

d. absorber means connected to said generator means for receiving concentrated absorbent solution and to said evaporator means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absorbent solution upon contact therewith, said absorber means including i. a plurality of heat transfer members each having a first surface and a second surface;

ii. means for passing a heat transfer fluid in heat transfer relationship with said second surfaces;

iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;

iv. means for bringing said vapor mixture into direct contact with the film of absorbent solution which is in heat transfer relationship with said first surfaces; and v. means associated with the first surfaces of said heat transfer members for promoting interfacial turbulence between the film of absorbent solution which is in heat transfer relationship with said first surfaces and said vapor mixture by establishing along said first surfaces a series of preferential absorption sites whereat the absorption of refrigerant vapor in said absorbent solution is enhanced, thereby increasing the concentration of additive in its vapor phase immediately adjacent said sites so as to reduce the surface tension of the absorbent solution at said sites and thereby generate roll cell motion within the film of absorbent solution such that relatively cool absorbent solution immediately adjacent the first surfaces of said heat transfer members is caused to circulate therefrom to the interface between said film of absorbent solution and vapor mixture to thereby increase the absorption capacity of said absorber means, said preferential absorption sites being spaced from one another along said respective first surfaces by a dimension lying within the range from about 0.03 inches to about 0.10 inches; and e. pump means connected to said absorber means and said generator means for returning dilute absorption solution from said absorber/means to said generator means.

13. An absorption refrigeration system of the type utilizing a liquid absorbent solution comprising an aqueous solution of lithium bromide and a refrigerant comprising water, and further including an additive for increasing the performance thereof, said system comprising a. generator means for vaporizing refrigerant from said absorbent solution and thereby concentrating same;

b. condenser means connected to said generator means for receiving high pressure refrigerant vapor therefrom and condensing same;

c. evaporator means connected to said condenser means for receiving condensed refrigerant and vaporizing same in heat exchange with a refrigeration load;

d. absorber means connected to said generator means for receiving concentrated absorbent solution and to said evaporator means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absorbent solution upon contact therewith, said absorber means including i. a plurality of heat transfer members each having a first surface and a second surface;

ii. means for passing a heat transfer fluid in heat transfer relationship with said second surfaces;

iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;

iv. means for bringing said vapor mixture into direct contact with the film of absorbent solution which is in heat transfer relationship with said first surfaces; and v. means associated with the first surfaces of said heat transfer members for promoting interfacial turbulence between the film of absorbent solution which is in heat transfer relationship with said first surfaces and said vapor mixture by establishing along said first surfaces a series of preferential absorption sites whereat the absorption of refrigerant vapor in said absorbent solution is enhanced, thereby increasing the concentration of additives in its vapor phase immediately adjacent said sites so as to reduce the surface tension of the absorbent solution at said sites and thereby generate roll cell motion within the film of absorbent solution such that relatively cool absorbent solution immediately adjacent the first surfaces of said heat transfer members is caused to circulate therefrom to the interface between said film of absorbent solution and vapor mixture to thereby increase the absorption capacity of said absorber means, said means associated with the first surfaces of said heat transfer members comprising a plurality of protuberances extending outwardly from said respective first surfaces, having a height substantially equal to the thickness of the film of absorbent solution formed on said respective first surfaces, and spaced from one another so as to define a two dimensional arrangement of protuberances along said respective first surfaces, said protuberances being of a size and shape such that the film of absorbent solution flows therebetween over said first surface and undergoes said roll cell motion.

14. The absorption refrigeration system of claim 13 wherein said protuberances are spaced from one another along said respective first surfaces by a dimension equal to from about 3 to 7 times their height.

15. The absorption refrigeration system of claim 14 wherein said protuberances are spaced from one another along said respective first surfaces by a dimension equal to from about 3 to 5 times their height.

16. The absorption refrigeration system of claim 13 wherein said protuberances are spaced from one another along said respective first surfaces by a dimension equal to from about 3 to 7 times their height.

17. The absorption refrigeration system of claim 16 wherein said protuberances are spaced from one another along said respective first surfaces by a dimension equal to from about 3 to 5 times their height.

18. An absorption refrigeration system of the type utilizing a liquid absorbent solution comprising an aqueous solution of lithium bromide and a refrigerant comprising water, and further including an additive for increasing the performance thereof, said system comprising a. generator means for vaporizing refrigerant from said absorbent solution and thereby concentrating same;

b. condenser means connected to said generator means for receiving high pressure refrigerant vapor therefrom and condensing same;

c. evaporator means connected to said condenser means for receiving condensed refrigerant and vaporizing same in heat exchange with a refrigeration load;

d. absorber means connected to said generator means for receiving concentrated absorbent solution and to said evaporator means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absorbent solution upon contact therewith, said absorber means including i. a plurality of heat transfer members each having a first surface and a second surface;

ii. means for passing a heat transfer fluid in heat transfer relationship with said second surfaces;

iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;

iv. means for bringing said vapor mixture into direct contact with the film of absorbent solution which is in heat transfer relationship with said first surfaces; and v. means associated with the first surfaces of said heat transfer members for promoting interfacial turbulence between the film of absorbent solution which is in heat transfer relationship with said first surfaces and said vapor mixture by establishing along said first surfaces a series of preferential absorption sites whereat the absorption of refrigerant vapor in said absorbent solution is enhanced, thereby increasing the concentration of additive in its vapor phase immediately adjacent said sites so as to reduce the surface tension of the absorbent solution at said sites and thereby generate roll cell motion within the film of absorbent solution such that relatively cool absorbent solution immediately adjacent the first surfaces of said heat transfer members is caused to circulate therefrom to the interface between said film of absorbent solution and vapor mixture to thereby increase the absorption capacity of said absorber, said means associated with the first surfaces of said heat transfer members comprising a plurality of protuberances extending outwardly from said respective first surfaces, having a height lying within the range from about 0.010 inches to about 0.020 inches, and spaced from one another so as to define a two dimensional arrangement of protuberances along said first surfaces, said protuberances being of a size and shape such that the film of absorbent solution flows therebetween over said first surface and undergoes said roll cell motion; and e. pump means connected to said absorber means and said generator means for returning dilute absorption solution from said absorber means to said generator means.

19. An absorption refrigeration system of the type utilizing a liquid absorbent solution comprising an aqueous solution of lithium bromide and a refrigerant comprising water, and further including an additive for increasing the performance thereof, said system comprising a. generator means for vaporizing refrigerant from said absorbent solution and thereby concentrating same;

b. condenser means connected to said generator means for receiving high pressure refrigerant vapor therefrom and condensing same;

c. evaporator means connected to said condenser means for receiving condensed refrigerant and vaporizing same in heat exchange with a refrigeration load;

d. absorber means connected to said generator means for receiving concentrated absorbent solution and to said evaporator means for receiving refrigerant vapor and absorbing same in said concentrated absorbent solution to thereby produce dilute absorption solution, said additive existing within said absorber means in at least a vapor phase in admixture with said refrigerant vapor, thereby forming a vapor mixture, and being effective to reduce the surface tension of the absorbent solution upon contact therewith, said absorber means including i. a plurality of heat transfer members each having a first surface and a second surface;

ii. means for passing a heat transfer fluid in heat transfer relationship with said second surfaces;

iii. means for passing said concentrated absorbent solution in heat transfer relationship with said first surfaces such that a film of absorbent solution is formed thereon, whereby heat may be transferred from said absorbent solution, through said heat transfer members, to said heat transfer fluid;

iv. means for bringing said vapor mixture into direct contact with the film of absorbent solution which is in heat transfer relationship with said first surfaces; and v. means associated with the first surfaces of said heat transfer members for promoting interfacial turbulence between the film of absorbent solution which is in heat transfer relationship with said first surfaces and said vapor mixture by establishing along said first surfaces a series of preferential absorption sites whereat the absorption of refrigerant vapor in said absorbent solution is enhanced, thereby increasing the concentration of additive in its vapor phase immediately adjacent said sites so as to reduce the surface tension of the absorbent solution at said sites and thereby generate roll cell motion within the film of absorbent solution such that relatively cool absorbent solution immediately adjacent the first surfaces of said heat transfer members is caused to circulate therefrom to the interface between said film of absorbent solution and vapor mixture to thereby increase the absorption capacity of said absorber means said means associated with the first surfaces of said heat transfer members comprising a plurality of protuberances extending outwardly from said respective first surfaces, havng a height of about 0.015 inches, and spaced from one another by about 0.050 inches so as to define a two dimensional arrangement of protuberances along said respective first surfaces, said protuberances being of a size and shape such that the film of absorbent solution flows therebetween over said first surface and undergoes said roll cell motion; and e. pump means connected to said absorber means and said generator means for returning dilute absorption solution from said absorber means to said generator means.

20. The absorption refrigeration system of claim 19 wherein said protuberances are of square cross section and are about 0.015 inches along each side.

21. The absorption refrigeration system of claims 13, 14, 15, 18, 16, 17, 19, or 20 wherein said additive comprises octyl alcohol.

* * * * *

UNITED STATES PATENT AND TRADEMARK OFFICE
CERTIFICATE OF CORRECTION

PATENT NO. : 4,223,539
DATED : September 23, 1980
INVENTOR(S) : Ralph L. Webb and Louis J. Mougin It is certified that error appears in the above-identified patent and that said Letters Patent are hereby corrected as shown below:

Claim 9, line 1, change "8" to --7--.

Claim 10, line 4, insert --5-- following "to".

Claim 11, line 2, delete "means".

Claim 16, line 1, change "13" to --18--.

Signed and Sealed this

Sixth Day of January 1981

[SEAL]

Attest:

SIDNEY A. DIAMOND

Attesting Officer

Commissioner of Patents and Trademarks